---

United States Patent [19]

Banker

[11] 4,052,110

[45] Oct. 4, 1977

[54] FLUID PRESSURE BRAKE SYSTEM WITH ELECTRONICALLY ASSISTED APPLICATION AND RELEASE

[75] Inventor: William W. Banker, Watertown, N.Y.

[73] Assignee: General Signal Corporation, Rochester, N.Y.

[21] Appl. No.: 716,057

[22] Filed: Aug. 20, 1976

[51] Int. Cl.² .................... B60T 15/32; B60T 15/52
[52] U.S. Cl. ........................................ 303/36; 303/69
[58] Field of Search ................... 303/15, 16, 20, 36, 303/69

[56] References Cited

U.S. PATENT DOCUMENTS 3,901,558   8/1975   Burkett .................... 303/16

*Primary Examiner*—Duane A. Reger
*Attorney, Agent, or Firm*—Pollock, Vande Sande & Priddy

[57] ABSTRACT

A fluid pressure brake system includes electrically actuated application and release valves. Upon brake application, brake control pipe pressure is vented electrically to accelerate application. Upon brake release, supply reservoir pressure is admitted electrically to the brake control pipe to accelerate release. In emergency situations, auxiliary equipment may be operated from the main reservoir pipe, the supply reservoir or the brake pipe, as desired. A novel solenoid-actuated valve is disclosed, which cooperates with unique indicator circuitry to provide a positive, continuous indication of a preceding electrically assisted application or release.

3 Claims, 5 Drawing Figures

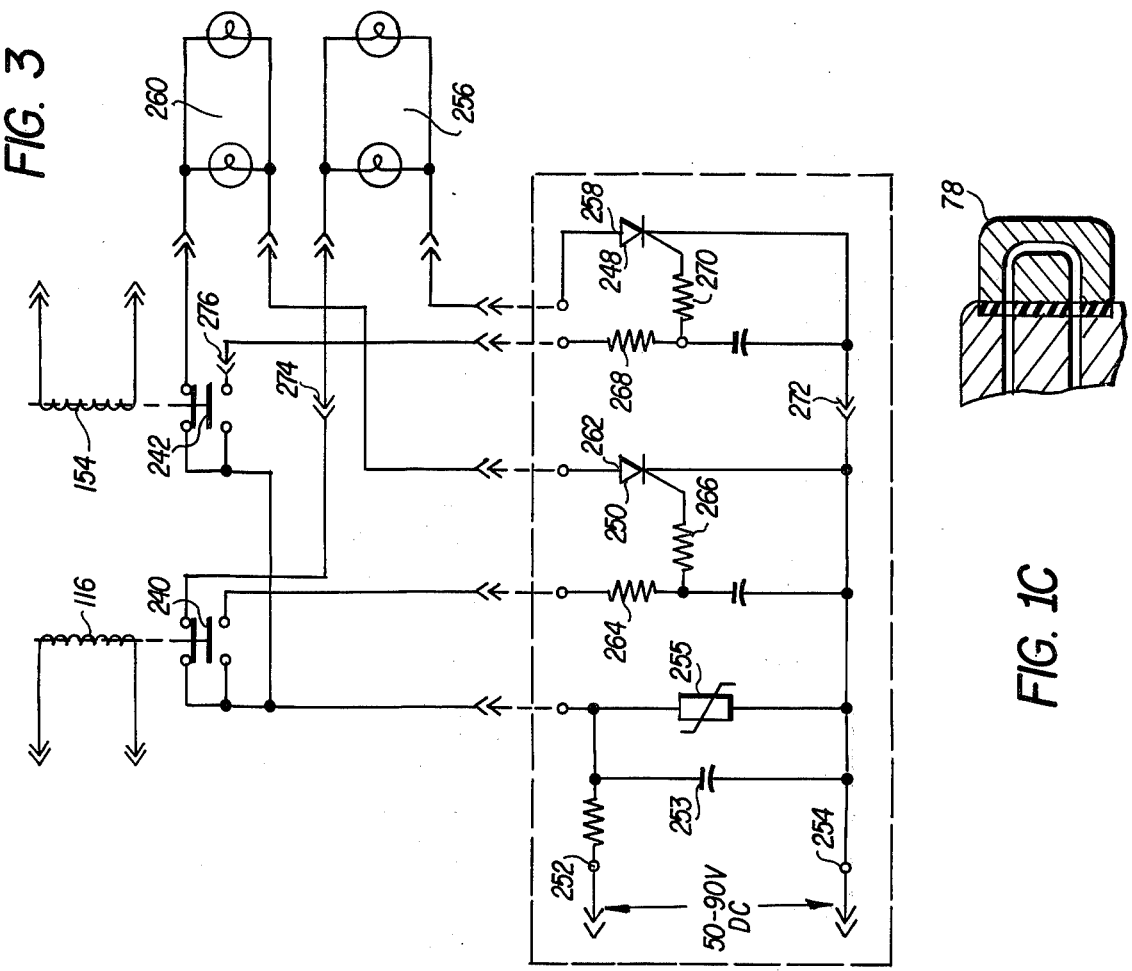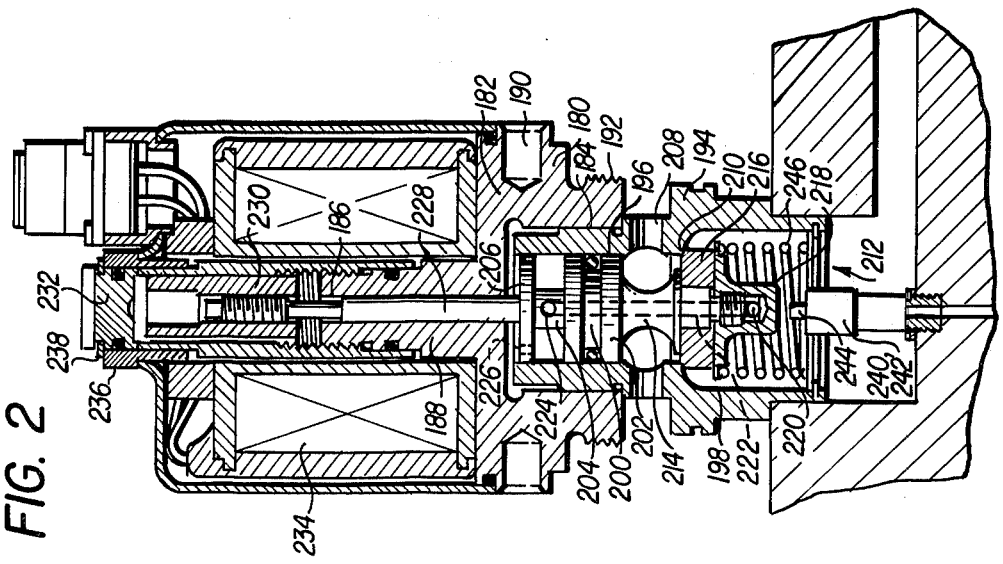

FLUID PRESSURE BRAKE SYSTEM WITH ELECTRONICALLY ASSISTED APPLICATION AND RELEASE

CROSS REFERENCE TO RELATED APPLICATION

This application is related to an application filed concurrently herewith by W. W. Banker and A. W. Lumbis under the title Electro-Pneumatic Brake System With Valve Actuation Checking Circuit, assigned Ser. No. 716,056.

BACKGROUND OF THE INVENTION

Prior art rail vehicles sometimes have been provided with fluid pressure operated friction brake systems including some sort of an electrical assist feature. In a typical prior art system, a conduit known as a brake pipe extends from the operator's station aft through both the locomotive and any trailing cars. Also extending from the locomotive through the trailing cars is a main reservoir equalizing pipe which is pressurized to a predetermined level from a compressor located in the locomotive. Each individual rail car includes a control valve which responds, for example, to reductions in the brake pipe pressure by admitting pressurized fluid from a reservoir located in the rail car to the fluid pressure operated friction brake apparatus of the vehicle.

Where there are a large number of rail cars and a correspondingly long brake pipe running from car to car, significant delays in response can be experienced as a pressure signal initiated at the locomotive moves aft along the train through the brake pipe. Various efforts have been made to improve the speed with which the pneumatic signal moves through the train, such as the provision of mechanically and electronically actuated venting valves in the cars which modify brake pipe pressure locally in some manner to accelerate movement of the brake application signal through the train. To release the brakes in such prior art systems, it is necessary to repressurize or recharge the brake pipe so that the control valve will vent the pressure applying the friction brakes. As in the case of brake application, repressurization of the long brake pipe requires considerable time which may lead to an unacceptable delay in obtaining a full release of the friction brakes. Some prior art systems which deal with the problem of accelerating brake application and release by the use of electrically operated valving systems are shown in Instruction Pamphlet No. 78 of the New York Air Brake Company, published in 1970 for the PS-68 Brake Equipment. Also, U.S. Pat. Nos. 3,709,564 and 3,716,274 of the Westinghouse Air Brake Company deal with a related problem.

In the prior art brake systems of the type just mentioned and other brake systems not having electrical assist features, it is known to provide the individual rail cars with fluid pressure operated auxiliary equipment such as load levelling springs, pneumatically operated entrance and exit doors, fresh water supply systems and the like. Typically, such auxiliary devices are connected alternatively to the main reservoir pipe or the brake pipe of the vehicle. Thus, the auxiliaries will operate properly as long as pressure is maintained in the brake pipe and/or main reservoir pipe. However, in the event of a separation of one rail car from the train due to an accident such as a derailment, a situation may arise in which the auxiliary equipment, particularly the exit doors, is not able to function properly due to a shortage of pressurized fluid.

While the prior art does teach the use of electrically assisted fluid pressure operated brake systems, it has generally been the practice to design such systems with a large factor of safety so that the fluid pressure actuated brakes will function adequately even if the electrical assist feature is rendered inoperative. In recent years, however, more and more sophisticated brake systems have been developed which rely to a greater extent upon the accelerated brake application and release achieved due to the presence of electrical assist features. In order to assure proper train operation with the electrical assist features, it is mandatory that the electrical assist valves function properly on every trailer car. To ensure that these solenoid actuated valves are operative, the Federal Railway Association has required that a terminal test be performed on each train before it goes into service. To determine whether the valves in each car of a train have responded to an electric application and release, it is necessary to apply the brakes and then have an inspector walk the length of the train to determine whether the brakes on each car have been applied properly; and then to release the brakes and have the inspector again walk the length of the train to determine whether the brakes on each car have released properly.

In such a situation, several problems have found to be prevalent. For example, the solenoid actuated valves are only energized for a short period of time, even with a full service application. Thus, the inspector does not have sufficient time to walk the length of the train before the solenoids have become deenergized. Also, the electrical and pneumatic systems function in parallel, so that the presence of a brake cylinder pressure is not necessarily an indication that the electrical assist valves have functioned properly. It has been suggested that the electrical continuity checks could be made to establish that a circuit has been completed through the train; however, this does not provide a foolproof indication that the valve elements have actually moved in response to the electrical signal directed to the valve's solenoid. One prior art approach to monitoring such valve actuation is shown in U.S. Pat. No. 3,937,074.

OBJECTS OF THE INVENTION

An object of the invention is to provide a fluid pressure operated brake system for a rail vehicle having an electrical assist feature which provides for an accelerated depressurization of the vehicle brake pipe during brake application.

Another object of the invention is to provide such an electrically assisted, fluid pressure actuated brake system in which an accelerated repressurization of the brake pipe is achieved via an electrically operated valve which connects the brake pipe to the supply reservoir of each individual car.

Yet another object of the invention is to provide a fluid pressure operated brake system in which the rail car auxiliary devices are pressurized via a governor portion and separate reservoir isolated from the main reservoir pipe by a check valve.

Still another object of the invention is to provide such a brake system having a monitoring circuit for indicating continuously that a brake application or release has recently occurred by actuating an alarm such as a light at an exterior location on each car, in response to physical movement of the valve elements.

The above objects of the invention are given only by way of example; thus, other desirable objects or advantages inherently achieved by the invention may occur to those skilled in the art. Nonetheless, the invention embodies certain advantageous features as will be apparent from the following description.

SUMMARY OF THE INVENTION

The above objects and other advantages are achieved by fluid pressure brake systems according to the present invention which include a brake pipe for conveying pressure signals for brake application and release through a rail vehicle, a supply reservoir and a brake cylinder pipe for conveying pressurized fluid to the friction brakes of the vehicle. A control valve responsive to the pressure in the brake pipe is provided which directs pressurized fluid to the relay valve which takes additional pressurized fluid from the supply reservoir and directs it to the brake cylinder pipe to apply the brakes; and releases pressurized fluid from the relay valve which in turn releases pressurized fluid from the brake cylinder pipe to release the brakes. To provide an accelerated brake release, an electrically operable release valve is provided which interconnects the brake pipe and the supply reservoir to repressurize the brake pipe during brake release. Such a system also includes, in another embodiment, a main reservoir pipe which conveys pressurized fluid via a check valve to the previously mentioned supply reservoir. A governor valve is connected between the check valve and the supply reservoir to supply an auxiliary reservoir which is used to pressurize the auxiliary systems of the vehicle. Thus, the auxiliary systems may be pressurized either from the supply reservoir or the main reservoir pipe during operation.

BRIEF DESCRIPTION OF THE DRAWINGS

FIG. 1C shows a fragmentary view of the control valve as configured for graduated release.

FIG. 2 shows an elevational sectioned view of a solenoid valve adpated for use in the electrical assist feature of the present invention.

FIG. 3 shows a diagram of a checking circuit used in the present invention to indicate proper operation of the solenoid valves used for electrical assist feature.

DETAILED DESCRIPTION OF THE PREFERRED EMBODIMENTS

Figure 1A:
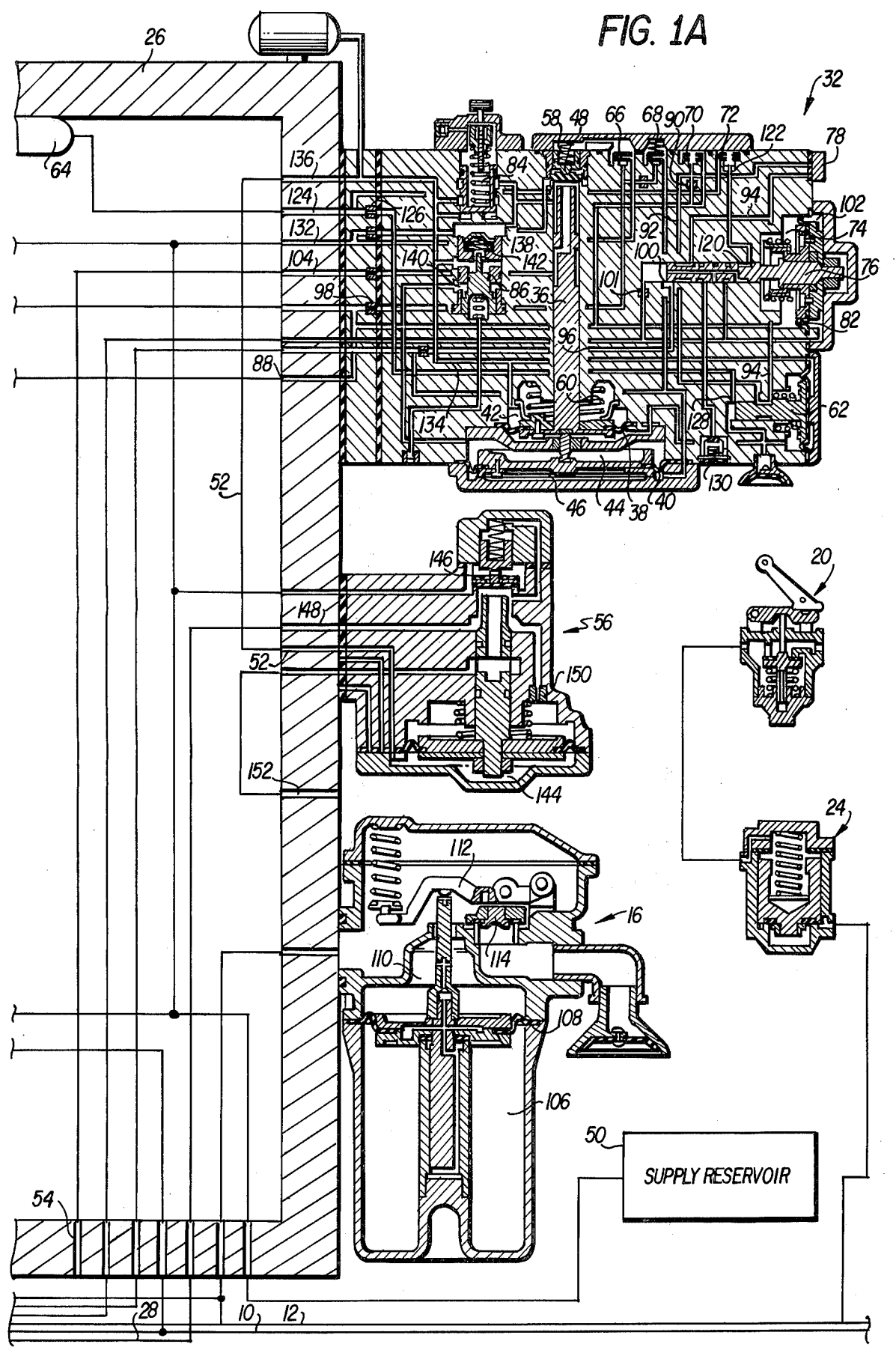
FIGS. 1A and 1B show a schematic view of a fluid pressure operated brake system according to the present invention.

There follows a detailed description of the preferred embodiments of the invention, reference being had to the drawings in which like reference numerals identify like elements of structure in each of the several figures.

Figure 1B:
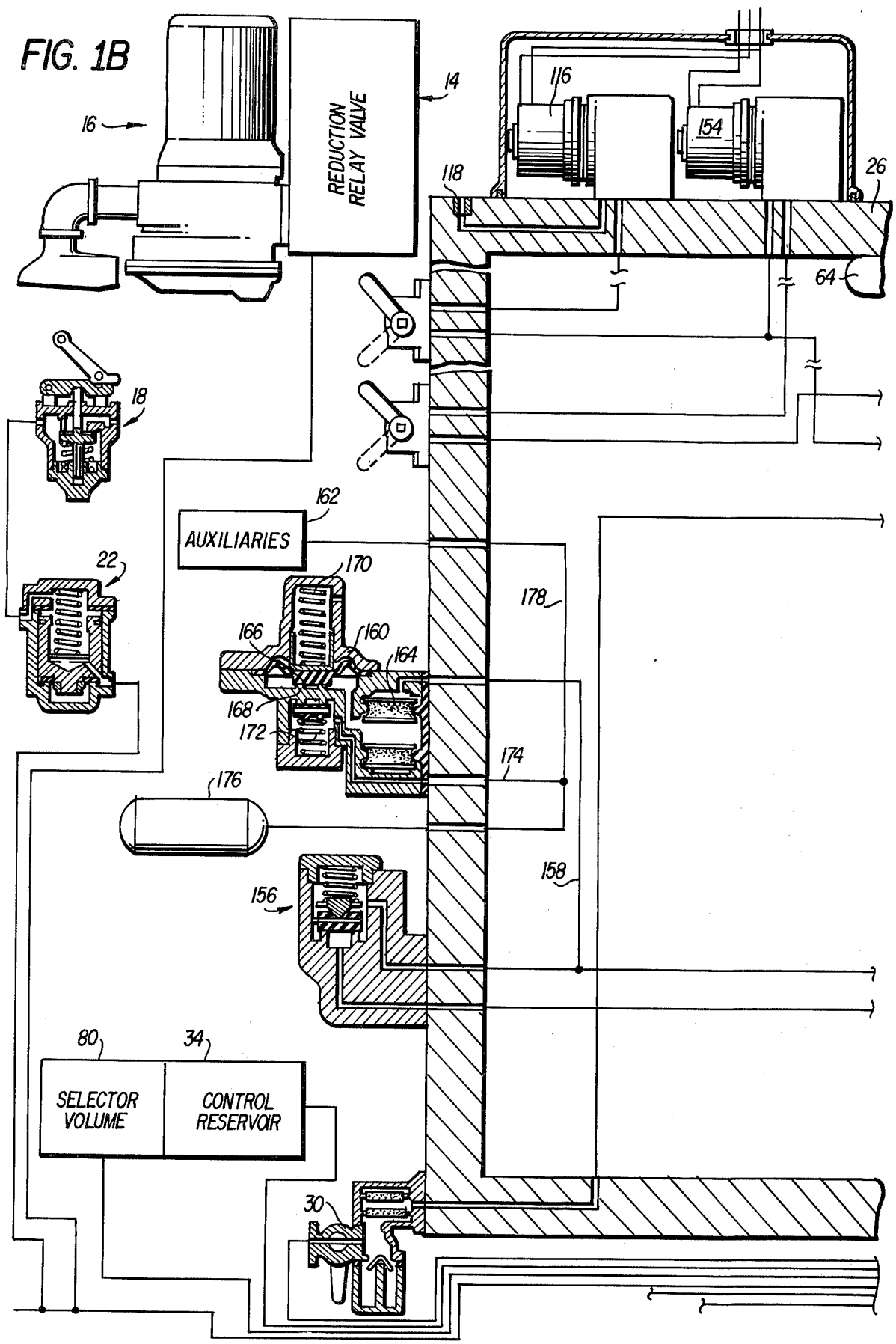

FIGS. 1A and 1B show a schematic diagram of a brake system according to the present invention as configured for application to a single rail car. A conventional main reservoir equalizing pipe 10 runs along the length of the car and conveys pressurized air from a compressor and reservoir located in the lead car or locomotive (not shown). Also extending along the car is a conventional brake pipe 12 which leads aft through the train from a brake control valve (not shown) located in the lead car or locomotive. A partial pressure reduction in brake pipe 12 signals the need for a corresponding brake application and is known as service braking; whereas, a repressurization of brake pipe 12 signals the need for a brake release. Connected to brake pipe 12 is a conventional reduction relay valve 14 which serves in the well-known manner to release a measured volume of pressurized fluid from brake pipe 12 in response to a preset drop in brake pipe pressure, thereby accelerating service brake application signals through brake pipe 12. A vent valve 16 is attached to reduction relay valve 14 and also serves to accelerate the pressure reduction signal through the brake pipe 12 for emergency braking or completely venting the brake pipe. At either end of the rail car, local brake valves 18 and 20 are provided which may be actuated by the train conductor to effect an emergency brake application via brake application valves 22 and 24 in the known manner. A manifold block or pipe bracket 26 is mounted to the underbody of the car to receive inward flow of pressurized fluid from main reservoir pipe 10 and to control both the inward and outward flow from and to brake pipe 12. A brake cylinder pipe 28 leads from manifold 26 to the fluid pressure actuated friction brakes of the vehicle (not shown).

Charging the system according to the invention is usually accomplished through the main reservoir line but may be done through the brake pipe 12 which is pressurized from a compressor located in the locomotive or lead car when the main reservoir line is not in use. Pressurized fluid, normally air, flows through a combined dirt collector and cut out valve 30 which strains the air flowing to the control valve 32 and also may be used to remove control valve 32 from the system when desired.

Control valve 32 is an automatic control valve of generally known design which responds to pressure reductions in brake pipe 12 to develop braking pressures in brake cylinder pipe 28 as a function of the pressure levels existing in brake pipe 12 and a control reservoir 34. Control valve 32 includes a service spool valve 36 which comprises two diaphragms 38 and 40 selected for proper reference of brake cylinder pressure development in volume 42, guided by reductions in brake pipe pressure in volume 44 with additional reference to control reservoir pressure in volume 46. An application and release valve element 48 controls the movement of air from a supply reservoir 50 to a relay valve control pipe 52 during application and from pipe 52 to atmosphere via port 54 during release. Whenever a brake pipe pressure reduction occurs, service spool valve 36 moves upwardly to close the release valve and to open the application valve portions of valve element 48. Service valve spool 36 exhausts control pressure from relay valve 56 whenever brake pipe pressure is increased after an automatic brake application. The diaphragm area ratio of diaphragms 38 and 40, together with springs 58 and 60, permits stable operation of the automatic brake together with proper development of the brake cylinder pressure to operate satisfactorily with other systems of automatic brake control. Control valve 32 includes a charging valve 62 which cuts off the flow of air from the quick service volume 64 to atmosphere and from control reservoir 34 to brake pipe 12 during graduated release operation of the control valve.

Also included in control valve 32 are a number of check valves for controlling flow of pressurized air through the device. Supply reservoir charging check valve 66 controls charging of supply reservoir 50 from brake pipe 12. Charging check valve 68 controls charging of control reservoir 34. Control reservoir dissipation check valve 70 controls dissipation of control reservoir air into brake pipe 12 during direct release operation of control valve 32. Finally, backflow check valve 72 controls dissipation of brake pipe air from spring chamber 74 of selector valve 76 back to the quick service volume 64, during the initial stages of a brake application. Selector valve 76 is a diaphragm operated spool valve which functions similarly to a triple valve. With air pressure from selector volume 80 on the outer face of the diaphragm 82 opposed by brake pipe pressure in spring chamber 74, it functions at the start of a brake pipe pressure reduction to produce a quick service function. The valve also provides a graduated release function with graduated release cap 78 in the graduated release position shown in FIG. 1A. With graduated release cap 78 in the direct release position shown in FIG. 1C, the valve provides a direct and prompt release. Selector valve 76 controls the release of an emergency brake application by locking up selector volume pressure on the outer face of the selector valve diaphragm during the application, making it necessary to first increase brake pipe pressure to the value of selector volume pressure before the release of the emergency brake application can be accomplished.

Two brake cylinder pressure limiting valves 84 and 86 are provided. Valve 84 limits the maximum brake cylinder pressure obtained during service brake applications and valve 86 limits the maximum brake cylinder pressure obtained during emergency brake applications. The two valves are arranged in parallel so that emergency brake cylinder pressure limiting valve 86 is held closed by a predetermined brake pipe pressure which permits maximum brake cylinder pressure valve 84 to remain open during service brake applications. Valve 86 is opened to limit the brake cylinder pressure only after the brake pipe pressure has been reduced to a value of approximately 10 to 15 psi, as occurs when venting the brake pipe during emergency brake applications.

When the brake system according to the invention is to be charged, pressurized air is introduced through cut out cock and strainer 30 to passage or port 88 of the pipe bracket. Air flows to spring chamber 74 of selector valve 76 and to chamber 44 located between the diaphragms 38 and 40 in service valve 36. In emergency brake cylinder pressure limiting valve 86, brake pipe pressure opposes spring pressure to keep the spool of the limiting valve in its downward or closed position, as illustrated. The chamber above control reservoir dissipation check valve 70 is pressurized; and at the same time, air flows through charging choke 90 into passage 92, through the spool of charging valve 62, to passage 94, and through the spool of selector valve 76 and into passage 96 through which control reservoir 34 is pressurized. With the graduated release cap 78 in its direct release position as shown in FIG. 1C, passage 92 is connected directly to passage 94 through the cap, thus bypassing charging valve 62. Finally, flow is introduced through choke 98 to supply reservoir charging check valve 66 through which supply reservoir 50 is charged. Control reservoir air flowing through the selector valve spool from passage 94 flows through port 100 to the spool valve end chamber from which it flows through choke 101 to both the selector valve reservoir 80 and the chamber 102 on the outer face of selector valve diaphragm 82.

With the brake system fully charged, the control reservoir and brake pipe pressures acting on the opposite faces of large diaphragm 40 of service valve 36 are identical. The service valve piston and diaphragm assembly are therefore held in their lower-most position by the tension of the release spring acting on the diaphragm assembly. The end of the service valve diaphragm stem is drawn away from seating contact with the application and release check valve 84, as shown, to allow brake cylinder pipe 28 to be exhausted to atmosphere through passage 104.

When it is desired to make a serivce application of the brakes, the operator vents braks pipe 12 at the lead car or locomotive which results in a drop in brake pipe pressure. This drop in brake pipe pressure is sensed by reduction relay valve 14 which releases a predetermined volume of air from brake pipe 12 to accelerate the pressure signal through the brake pipe. During normal operation with the brakes released, brake pipe pressure is directed into a reservoir volume 106 located below diaphragm 108 of vent valve 16. When the brake pipe pressure drops during a service application, the pressure in volume 110 located above diaphragm 108 drops much more quickly than the pressure in reservoir 106, causing diaphragm 108 to move upwardly but without adequate force to open valve 114.

During emergency braking the brake pipe pressure drops rapidly to zero causing the pressure in volume 110 located above diaphragm 108 and therefore the downward force on the diaphragm 108 to reduce at a rate such that the pressure in reservoir 106 results in an upward force of such magnitude to pivot arm 112 and open valve 114 venting brake pipe to atmosphere.

The accelerated pressure reduction in brake pipe 12 during service braking is further augmented by solenoid actuated application valve 116 which is opened in response to an electrical signal received from the locomotive or lead car to vent brake pipe 12 to atmosphere via an open choke 118. When the operator has signalled for a service brake application by moving his brake valve handle, the brake pipe pressure will drop to a predetermined level at a rate which is governed primarily by reduction relay valve 14, and application valve 116 in the manner just discussed. The gradual reduction in brake pipe pressure will be felt in chamber 44 above large service valve diaphragm 40. The pressure differential caused by the higher control reservoir pressure acting against the outer face of diaphragm 40 will initiate upward movement of the service valve diaphragm assembly and piston stem, thus closing the release valve and opening the application valve. Opening of the application valve admits pressurized fluid from supply reservoir 50 to control pipe 52 of relay valve 56.

The reduction of brake pipe pressure also occurs in spring chamber 74 of selector valve 76. The resulting pressure differential set up across selector valve diahragm 82 then moves the diaphragm assembly and spool valve to permit flow through a number of passages. Port 100 is closed, isolating the selector reservoir from the control reservoir. Passage 94 is disconnected from port 100 at the selector valve spool, thus isolating control reservoir air from brake pipe air. Quick service action occurs when the brake pipe air in spring chamber 74 is allowed to flow through port 120, choke 122, backflow check valve 72 and port 124 to quick service volume 64. The air collected in volume 64 in then dissipated through choke 126 and port 128 to atmosphere past the end of the spool of charging valve 62. The selector reservoir pressure acting through choke 101 and against the outer face of selector valve diaphragm 82 is vented at a controlled rate through the spool of valve 76 past check valve 130 to atmosphere. The service spring in the selector valve is engaged and its force, coupled with the brake pipe pressure, opposes the force of the selector volume air pressure. Whenever the point of equalization of forces across diaphragm 82 is reached, the selector valve 76 will assume a lapped position, at which time the selector volume is cut off from exhaust at the selector valve spool to terminate further reduction of selector volume pressure.

When the application valve is open as described above, supply reservoir air flows through port 132 past the unseated application valve and through the service brake cylinder limiting valve 84 into a number of passages and chambers. Air moves via passage 134 to the outer face of the diaphragm of charging valve 62, where the initial build up of pressure will move the charging valve spool to first cut off the flow of brake pipe air from quick service volume 64 through port 128 to atmosphere. The charging valve spool will also cut off charging connection between passages 92 and 94. Air also flows to port 136 in the pipe bracket and from there to relay valve 56. Air moving into the large spring chamber above diaphragm 38 will cause pressure at that location to build up unitl the combined forces of spring 60, the air pressure in the spring chamber and the brake pipe pressure balance the force of the control reservoir pressure acting upwardly on large diaphragm 40. As this balance point is approached, service valve diaphragm assembly and piston stem will be moved downward to assume a lapped position where the application valve has been seated by spring tension and the release valve remains seated. Also, air pressure builds up on the underside 138 of the service brake cylinder limiting valve 84 until its pressure increases to a point in excess of the force applied by the limiting valve spring. When this occurs, the spool valve is moved upwardly to a position in which further flow of air from the application valve to port 136 is terminated. The spring force of the limiting valve spring thus limits the maximum pressure that can be delivered to relay valve 56 during a service brake application.

When the pressure in brake pipe 12 is reduced at a rate indicative of an emergency application, control valve 32 functions essentially as previously described for a service application; however, some additional features now come into play. The increased pressure differential across diaphragm 82 in the selector valve, resulting from the venting of brake pipe pressure, positions the diaphragm assembly and spool valve to enable the valve to provide not only those features obtained during service brake applications, but also to close off the selector volume. That is, the vent path through check valve 130 is closed. The supply reservoir air flowing past the application valve 48 flows to the brake cylinder limiting valve 84 through port 136 and on to relay valve 56. A chamber 140 is provided for brake pipe air in the emergency brake cylinder limiting valve 86. It is the pressure in chamber 140 that normally holds down the spool of emergency brake cylinder limiting valve 86. During the initial stages of an emergency brake application, emergency brake cylinder limiting valve 86 remains closed. As the brake pipe pressure continues to drop, and is reduced to a value between 10–15 psi, the force of the spring within the emergency brake cylinder limiting valve overcomes the force of the brake pipe pressure acting in chamber 140. The spool valve will then be moved upwardly, unseating the check valve 142 and providing an alternate passage for supply reservoir air to port 136 and relay valve 56. During emergency brake applications, the brake pipe pressure drop is so fast that at the time the emergency brake cylinder limiting valve 86 opens its check valve 142, service brake cylinder limiting valve 84 is still open. Check valve 142 will remain open to permit a continued flow of air to relay valve 56. The pressure of the air admitted to relay valve 56 increases and the service brake cylinder limiting valve 84 eventually closes when its pressure setting is reached. The continued increase of pressure also affects a downward force on the spool of the emergency brake cylinder limiting valve 86. When this pressure reaches a point slightly in excess of the force of the spring within the spool, the spool will be forced downwardly, permitting the check valve 142 to be seated to terminate further flow of supply reservoir air to relay valve 56.

The operation of relay valve 56 is familiar to those in the art. During a brake application, air pressure is developed by control valve 32 in the line connecting port 136 to relay valve 56. This air pressure is also developed in the chamber 144 below the large relay valve diaphragm and piston, causing the diaphragm assembly and piston to be moved upwardly. During this upward movement, the end of the piston stem, which includes an exhaust valve seat, first contacts and seals against the underside of the rubber check valve 146 to close the exhaust connection through the piston stem from the brake cylinder port 148. Further upward movement causes the rubber check valve 146 to be moved off its supply valve seat so that supply reservoir air is then free to flow past rubber check valve 146 to port 148 and the brake cylinders (not shown). Port 148 is also connected through a stabilizer choke 150 to the spring chamber on the inner face of the relay valve diaphragm so that as pressure is being developed in the brake cylinders, an equal pressure is being developed in the spring chamber. As the diaphragm becomes balanced, it is moved downwardly to a lap position where the rubber check valve 146 is seated against its supply valve seat to terminate further flow of air to the brake cylinders.

To release the brakes, the operator moves the brake valve handle to cause repressurization of brake pipe 12. The increase in brake pipe pressure causes a similar pressure increase in brake pipe chamber 44 above large service valve diaphragm 40 in the control valve 32. The combined forces of the brake cylinder pressure in volume 42, brake pipe pressure in volume 44 and release spring 66 act against control reservoir pressure in volume 46 to move the service diaphragm assembly and piston stem downwardly, thereby drawing the release valve seat out of contact with check valve 48. This permits a backflow of pressurized air through port 136 to atmosphere. The pressurized air acting on the outer face of the diaphragm of charging valve 62 is also vented so that spring force will return the charging valve spool and diaphragm assembly to its normal or charging position, wherein brake pipe to control reservoir charging is reestablished. Continued drop of brake cylinder pressure in the brake cylinder limiting valves 84 and 86 permits the spring within the service brake cylinder limiting valve 84 to move the valve downward. As the brake pipe pressure continues to build up, the emergency brake cylinder limiting valve 86 is also closed. With both valves 84 and 86 in their downward position, the remaining pressure acting through port 136 is rapidly vented. Increase of brake pipe pressure in the selector valve spring chamber 74 eventually causes the selector valve spool to return to its normal position, thereby reestablishing charging of the control reservoir and selector volume reservoir to brake pipe pressure.

During brake release, relay valve 56 experiences a reduction in the control air pressure acting on the outer face of the relay valve diaphragm. Due to the higher brake cylinder pressure remaining on the other side of the diaphragm, the diaphragm assembly and piston will move downward so that the exhaust valve seat will be drawn out of contact with rubber check valve 146. Brake cylinder air is then free to flow past the exhaust check valve seat and through the piston stem to exhaust port 152 and atmosphere. A graduated release of brake cylinder air may also be obtained whenever the controlled air pressure from control valve 32 is intermittently released. When this occurs, the higher brake cylinder pressure causes the diaphragm assembly to operate to open the exhaust valve until the diaphragm again becomes balanced after which it will again assume its lapped position and close the exhaust valve.

Repressurization of brake pipe 12 to achieve an accelerated brake release is caused by opening magnet valve 154 is response to the operator's brake release signal. Opening valve 154 connects brake pipe 12 to supply reservoir 50 for repressurization. This unique feature of the invention also permits the brakes of a single rail car to be released locally provided there remains sufficient pressure in supply reservoir 50 and a source of power to release valve 154.

Although charging can be accomplished from the brake pipe in the brake system according to the present invention, charging is normally via the main reservoir pipe and a check valve 156, as mentioned previously. The downstream side of check valve 156 is connected to supply reservoir 50 and to port 132 of control valve 32 so that charging from either the brake pipe or the main reservoir pipe may be easily achieved. Also connected to the downstream side of check valve 156 via passage 158 is a governor valve 160 which controls flow of air to the rail car auxiliary devices schematically indicated at 162. Governor valve 160 comprises an inlet strainer or filter portion 164 through which all air to the auxiliaries passes. Pressurized air then reaches the underside of a diaphragm 166 which is held against a valve seat 168 by a heavy spring 170. When the pressure in the volume below diaphragm 166 has reached a preselected level, diaphragm 166 is forced upward against the force of spring 170 thereby permitting flow past check valve 172 to passage 174. From passage 174, the air flows to an auxiliary storage reservoir 176 which is sized to maintain a sufficient reserve capacity to operate the auxiliary devices in the event of a loss of brake pipe or main reservoir pressure, or both. Passage 178 leads to auxiliary devices 162. The use of governor valve 160 ensures that the pressure existing in brake pipe 12 and main reservoir pipe 10 will not be depleted for the operation of auxiliary devices; moreover, the inclusion of auxiliary reservoir 176 ensures that sufficient air pressure will be available to operate critical auxiliary devices such as car doors and the like, as may be necessary during an emergency period.

Magnet valves 116 and 154 are identical in structure as shown in FIG. 2. Each valve comprises a base 180 of magnetic material such as steel which includes a radially extending coil support flange 182. A central bore 184 is provided in base 180. Central bore 184 extends upwardly to a smaller diameter plunger bore 186 which is located in a central boss 188 extending upwardly from coil support flange 182. Flange 182 includes a plurality of blind holes 190 located radially therein for cooperation with a conventional spanner during valve installation via threads 192.

A valve guide cylinder 194 of non-magnetic materials such as bronze is press-fitted within central bore 184. Guide cylinder 184 includes a central spool bore 196 at its upper end and a wider diameter inlet bore 198 at its lower end. A valve carrier 200 is slideably located within spool bore 196 and comprises a piston and O-ring assembly 202. Extending upwardly from piston and O-ring assembly 202 is a piston extension shaft 204 which terminates in a thin, cylindrical valve carrier guide 206. Guide 206 is sized to have a close fit within spool bore 196 so that the valve carrier 200 will be constrained to essentially axial movement with bore 196. Without guide 206, there would be some tendency for carrier 200 to rock about the center of piston and O-ring assembly 202.

Just below piston and O-ring assembly 202, a plurality of outlet ports 208 pierce guide cylinder 194. A valve seat 210 is provided between outlet port 208 and inlet port 212 located at the lower end of guide cylinder 194. Extending downwardly from piston and O-ring assembly 202 is a shaft 214 on which a valve washer 216 is secured by a nut 218. Nut 218 includes a radial bore 220 in communication with an axial bore 222 (in phantom) which passes upwardly through shaft 214, piston and O-ring assembly 202 and piston extension 204. At the upper end of axial bore 222, a radial bore 224 communicates with the volume between piston and O-ring assembly 202 and valve carrier guide 206. A passage 226 through guide 206 provides communication between the bottom of valve carrier 200 and the top of carrier guide 206 so that pressure equalization across the valve carrier is achieved.

A plunger rod 228 of aluminum or other non-magnetic material is slideably located in plunger bore 186 in position to contact the upper surface of carrier guide 206. A plunger 230 of suitable magnetic material is threadingly mounted on the upper end of plunger rod 228 and slideably located within a plunger guide tube 232 which is threaded onto boss 188 as indicated. Surrounding plunger guide tube 232 is a solenoid coil 234 of conventional construction which rests on coil support flange 182. Coil 234 is held in place by a retainer 236 which is secured to plunger guide tube 232 by means such as snap ring 238. A two-position application or release switch 240, 242 is mounted in the inlet plenum to the valve just below nut 218. Switch 240, 242 includes an upwardly extending plunger 244 which is positioned to be contacted by nut 218 when the valve is opened in response to energization of coil 234. Upon de-energization of coil 234, valve carrier 200 is returned to its illustrated, closed position by a return spring 246 located in inlet bore 198 of valve guide cylinder 194, as illustrated.

As previously mentioned, the invention provides a signalling means for indicating exteriorly of the rail vehicle that application and release magnet valves 116 and 154 have actually been operated to accelerate brake pipe depressurization or repressurization. The circuitry shown in FIG. 3 accomplishes this purpose. In general, the electric brake checking circit shown in FIG. 3 consists of 2 silicon controlled rectifiers 248 and 250. These rectifiers, when triggered by pulses resulting from the closure of a switch, provide a visual signal in the form of an application or release indicator light, indicating that either a brake application or release has been made on that specific car. This visual indication remains in effect until the opposite operation (application or release) has been performed, at which time the circuit switches to provide a correct application or release indication.

The electric brake checking circuit is designed to operate with an input voltage of 50 to 90 volts direct current. When a voltage in this range is applied to input terminals 252 and 254, a path is established through the normally closed contacts of the two-position apply magnet switch 240 and release indicator light 256 to the anode 258 of the release rectifier 248. The light is not illuminated, however, because rectifier 248 is in its blocking or non-conducting state. Similarly, a path is set up through the normally closed contact of the two-position release magnet switch 242 and application indicator light 260 to the anode 262 of the application rectifier 250. A capacitor 253 and a voltage dependent, symmetrical resistor 255 are connected across terminals 252 and 254 for transient suppression.

When the application magnet 116 is energized, it mechanically actuates the apply magnet switch 240. This opens the path to release indicator light 256 and rectifier 248 and closes the path through resistors 264 and 266 to the gate of rectifier 250, causing it to conduct and illuminate the application indicator light 260. This light remains illuminated until a release is made at which time the release magnet 154 actuates the release magnet switch 242. Actuating this switch opens the path to the application indicator light 260 causing it to be extinguished and, at the same time, closes the path through resistors 268 and 270 to the gate of rectifier 248 causing it to conduct and illuminate release indicator light 256. Release indicator light 256 will remain illuminated until another application is made, at which time the circuit will operate as previously described to illuminate application indicator light 260. With this type of checking curcuitry, it is a relatively simple matter for a trainman to walk the length of the train to see whether the electrical assist features are responding properly to application and release signals from the operator. Of course, if the magnet valves 116 and 154 are not functioning properly, the proper indicator lights will not be illuminated on that particular car.

In some applications, the circuitry of FIG. 3 may be simplified by deleting those portions of the circuit connected to the right of connectors 272, 274 and 276, leaving only rectifier 250, application indicator light 260 and their associated circuitry. Thus, when application magnet valve 116 is energized, it mechanically actuates apply magent switch 240. This closes the path through resistors 264 and 266 to the gate of rectifier 250, causing it to conduct and illuminate application indicator light 260. Light 260 remains illuminated until a release is made, at which time release magnet 154 actuates release magnet switch 242. Actuating this switch opens the path to application indicator light 260, causing it to be extinguished. Light 260 remains extinguished until another application is made, at which time the simplified circuit will operate as previously described to illuminate light 260.

Having described our invention in sufficient detail to enable those skilled in the art to make and use it, we claim:

1. A fluid pressure brake system for a rail vehicle, comprising:
   a brake pipe for conveying pressure signals for brake application and release through said vehicle;
   a supply reservoir located in said rail vehicle;
   a brake cylinder pipe located in said rail vehicle for conveying pressurized fluid to friction brakes in said vehicle;
   a control valve responsive to the pressure in said brake pipe for directing pressurized fluid from said supply reservoir to said brake cylinder pipe to apply said friction brakes and for releasing pressurized fluid from said brake cylinder pipe to release said friction brakes; and
   electrically operable release valve means interconnecting said brake pipe and said supply reservoir for repressurizing said brake pipe during release of said friction brakes, whereby accelerated brake release is achieved.

2. A brake system according to claim 1, further comprising:
   a main reservoir pipe for conveying pressurized fluid to said supply reservoir;
   check valve means for isolating said main reservoir pipe from said supply reservoir when the pressure in said supply reservoir exceeds a predetermined level;
   a governor valve having an inlet and an outlet, said inlet being connected between said check valve means and said supply reservoir; and
   an auxiliary reservoir connected to said outlet for supplying auxiliary systems in said vehicle.

3. A brake system according to claim 1, further comprising electrically operable application valve means interconnecting said brake pipe and atmosphere for depressurizing said brake pipe during application of said friction brakes, whereby accelerated brake application is achieved.

* * * * *